W. R. PALMER.
WATER COOLED FURNACE VALVE AND CHAMBER THEREFOR.
APPLICATION FILED JUNE 29, 1908.
927,378.
Patented July 6, 1909.
2 SHEETS—SHEET 2.
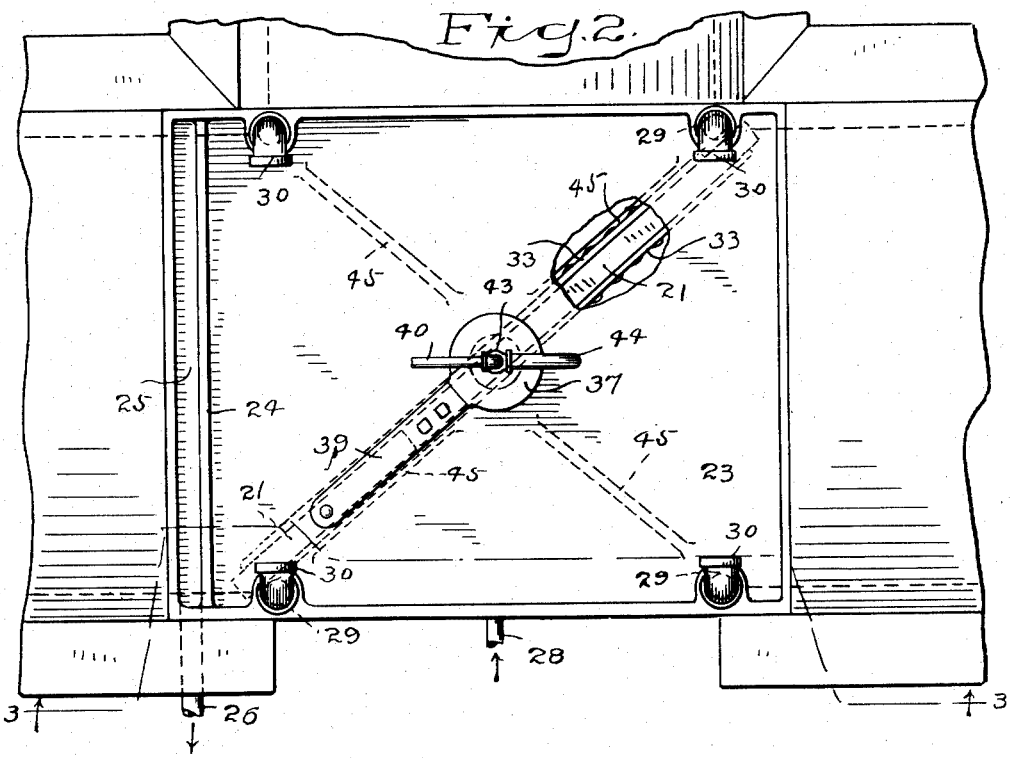
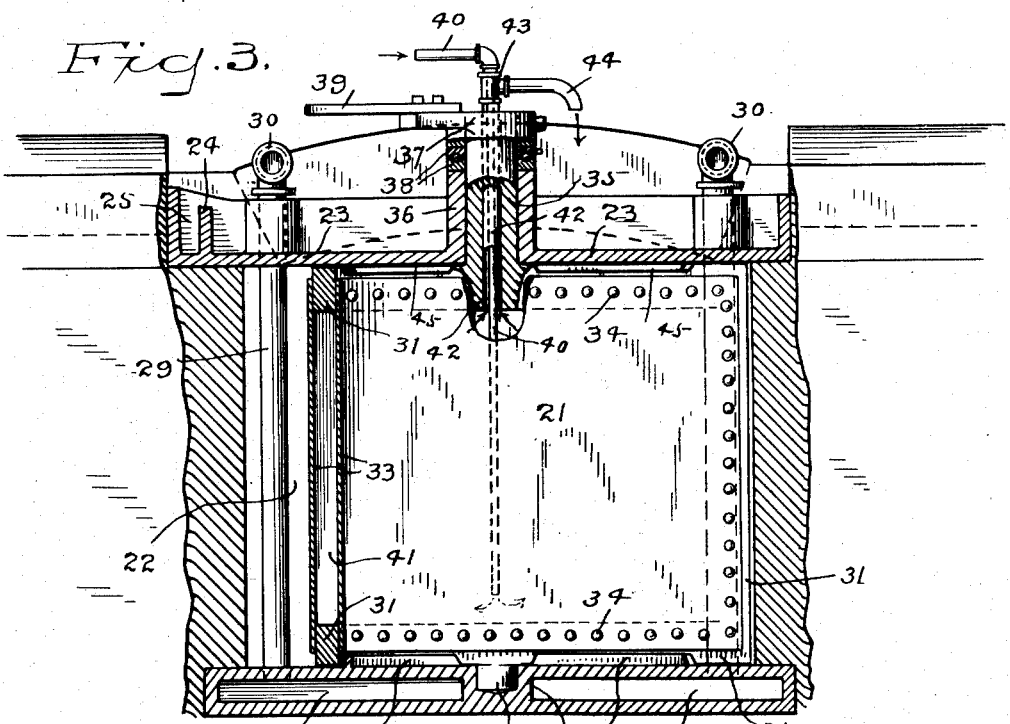
Witnesses:
H. A. Lamb
S. W. Atherton
Inventor
William R. Palmer
By Attorney

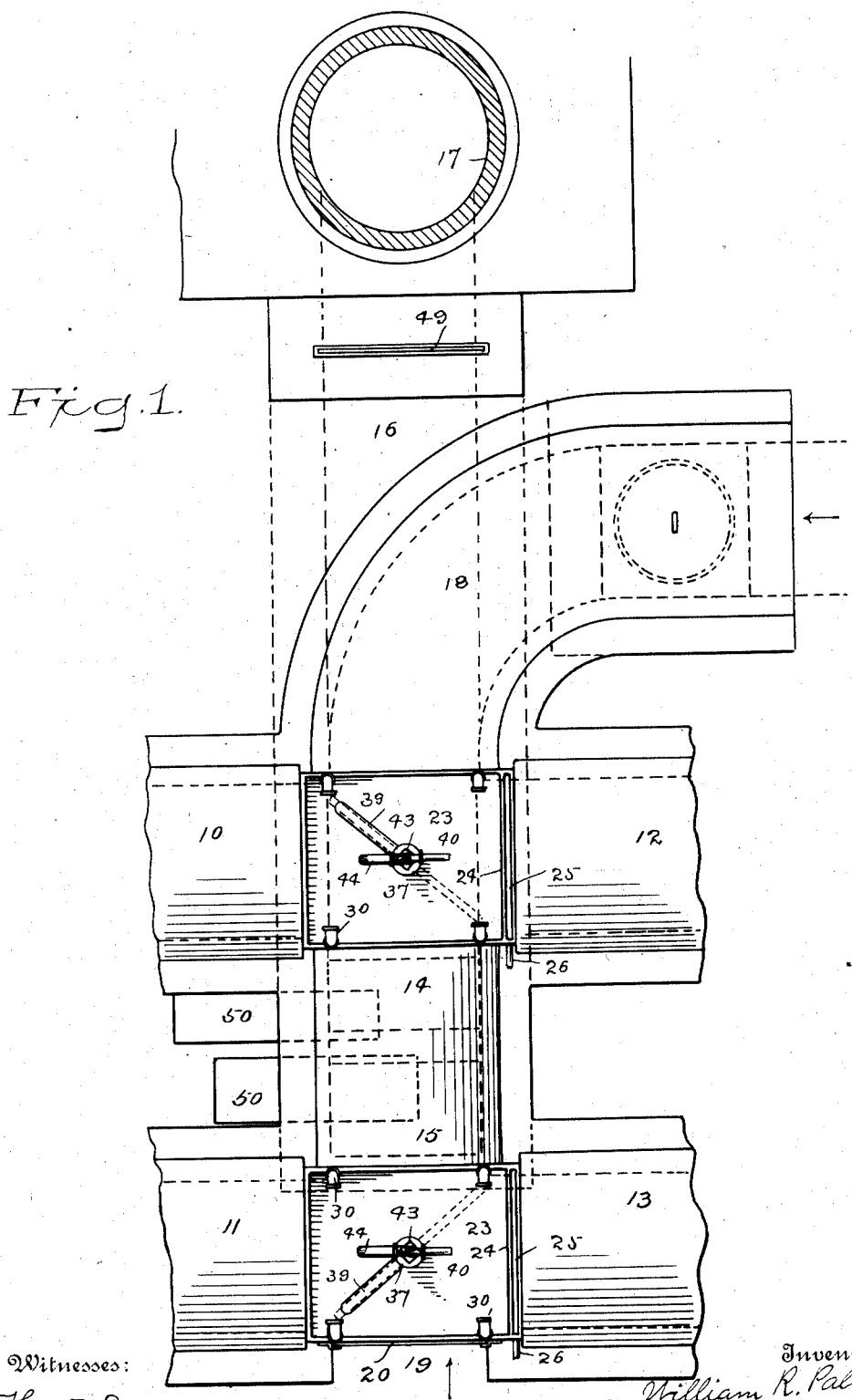

UNITED STATES PATENT OFFICE.

WILLIAM R. PALMER, OF BRIDGEPORT, CONNECTICUT.

WATER-COOLED FURNACE-VALVE AND CHAMBER THEREFOR.

No. 927,378.　　　　Specification of Letters Patent.　　　Patented July 6, 1909.

Application filed June 29, 1908. Serial No. 440,839.

*To all whom it may concern:*

Be it known that I, WILLIAM R. PALMER, a citizen of the United States, residing at Bridgeport, county of Fairfield, State of Connecticut, have invented a new and useful Water-Cooled Furnace-Valve and Chamber Therefor, of which the following is a specification.

This invention relates more especially to valves for reversing furnaces and has for its object to provide a valve of this type which shall be simple and inexpensive to construct, easy to repair, in which all parts shall be perfectly water-cooled, and which shall be so constructed that neither the incoming gas nor the outgoing products of combustion can come in contact with water.

With these and other objects in view I have devised the simple and novel reversible water-cooled valve, of which the following description in connection with the accompanying drawings is a specification, reference characters being used to indicate the several parts.

Figure 1 is a plan view of so much of the flues of a furnace as is necessary to illustrate the application and use of my novel valves, two being used in each furnace; Fig. 2 a plan view on an enlarged scale, illustrating the operation of a valve, the position corresponding with the position of the valve toward the bottom of the sheet in Fig. 1; and Fig. 3 is a vertical section on the line 3—3 in Fig. 2, looking in the direction of the arrows.
10, 11, 12 and 13 denote flues leading to and from the valve to the checkers, so called, which are not shown as they form no portion of the present invention.

14 and 15 indicate flues (shown in dotted lines only) leading downward from the valves to outgoing flue 16 (shown only in dotted lines) which leads to the stack indicated by 17.

18 indicates the incoming gas flue and 19 the incoming air flue, which is shown as provided with a sliding damper 20. It is not considered necessary for the purposes of this specification to illustrate the construction and arrangement of the flues in detail, as all reversing furnaces must be provided with these flues and their construction and arrangement is merely a matter of detail.

21 denotes a valve as a whole, each valve being adapted to oscillate in a chamber 22 formed in the brickwork.

23 denotes an open reservoir which may be a casting and which rests upon the brickwork and forms the top of the valve chamber. On one side of the reservoir (the left as shown in Figs. 2 and 3) is a cross-wall 24, lower than the walls proper of the reservoir, which forms a trough 25 from which a discharge pipe 26 leads. The bottom wall of each chamber 22 consists of a reservoir 27, which may also be a casting. Water under pressure is supplied to reservoir 27 by means of a pipe 28.

29 denotes vertical pipes, one at each corner of the chamber and projecting partially into it, which lead from reservoir 27 up through the bottom of reservoir 23 and are provided with nipples or nozzles 30 which discharge into reservoir 23, the overflow of the latter reservoir running over the top of cross-wall 24 into the trough and passing out through discharge pipe 26. A constant flow of water under any required pressure through the reservoirs and pipes insures that the valve chamber may be kept at as low a temperature as may be required.

Since the water is first supplied to the lower reservoir and passes upward through the pipes 29 and discharges into the upper reservoir which, in the embodiment shown, is open, the water flows in the direction that would be taken by such steam as might be generated and its flow would not be obstructed by such steam, and there is no liability of an explosion due to such generation of steam.

If preferred, pipe 28 may be dispensed with and the water supply pipe may be connected to one of the vertical pipes 29 and forced through said pipe 29 into the lower reservoir, water passing from the lower to the upper reservoir through the other three pipes 29.

The valve is itself a reservoir and consists simply of an angular frame 31 and side plates 33 riveted thereto as at 34. The upper bar of the frame is provided with a hollow journal 35 which is adapted to oscillate in a hub 36 which extends upward from the bottom of reservoir 23.

37 denotes a collar rigidly secured to the upper end of the journal. Intermediate the hub and collar 37 I preferably place collars provided with circular races to receive balls forming a ball bearing, indicated by 38, which supports the valve and permits it to oscillate freely, the valve being operated by means of a hand lever 39 secured to collar 37. Water is supplied to the valve by means of a pipe 40 which extends downward nearly to the bottom of the reservoir in the valve, which is indicated by 41. Pipe 40 is rigidly secured concentrically in a discharge pipe 42, which is of larger diameter than pipe 40, leaving ample space outside of pipe 40 for the discharge of water from the valve. Pipe 42 is rigidly secured in place and the journal of the reservoir oscillates exteriorly thereto. It will be readily understood from Fig. 3 that hub 36 is formed integral with or is secured to the bottom of reservoir 23, and that the journal of the reservoir oscillates within the hub and fixed pipe 42 passes through the journal. At the upper end of pipe 42 is a hub 43 to which pipe 40 is rigidly secured and which is provided with a nozzle 44 for the discharge of water from pipe 42 into reservoir 23. Water to cool the valve enters through pipe 40 which carries it nearly to the bottom of reservoir 41. The outgoing water passes through discharge pipe 42, lying outside the pipe 40, and is discharged into reservoir 23. It will thus be seen that the water from reservoir 27 below the valve and reservoir 41 within the valve flows into reservoir 23, passes over cross-wall 24 into the trough and out through discharge pipe 26.

The entire weight of the valve may be supported by the ball bearing. In order to retain the valve in a central position and prevent displacement I provide a central lug 47 on the under side of the valve frame which engages a step in a central hub 46 in reservoir 27, as clearly shown in Fig. 3.

45 denotes stop ribs in the valve chamber formed upon the upper wall of reservoir 27 and the under wall of reservoir 23, which are placed in such alinement relatively to pipes 29 that they receive the blow of the valve in swinging it to position and prevent the blow being upon the pipe, the ribs acting to stop the valve at just the instant that it comes into engagement with the pipes, the pipes and the ends of the valve making seals so as to prevent escape of air, gas or the products of combustion as may be.

49 denotes the usual stack damper and 50 check dampers in flues 14 and 15. The action of these dampers, however, is wholly unimportant so far as the principle of the present invention is concerned.

The operation is as follows: It is of course well understood that in reversible furnaces air and gas are admitted separately and pass through heating chambers, commonly called checkers, and that after being heated the air and gas are mixed and pass to the combustion chamber, the products of combustion passing out through similar chambers or checkers. While this is taking place, the checkers upon one side are being heated by the outgoing products of combustion, and the checkers upon the other side are losing their heat, which is being utilized in heating the incoming air and gas. After the furnace has been running for a predetermined time, for example—fifteen minutes, the passage of the air and gas and the products of combustion is reversed and the air and gas are passed through the previously heated checkers and the checkers previously used for heating purposes are re-heated by the outgoing products of combustion, the object being to heat the incoming air and gas to the highest degree possible by passing them through checkers previously heated by the outgoing products of combustion, the reversing of the air and gas and the products of combustion being effected by the valves which are subjected to intense heat as they are constantly exposed to the highly heated outgoing products of combustion within a highly heated chamber. My present invention enables me to cool both the chambers and the valves by means of running water and to maintain them at a low enough temperature to prevent injury to the valves. Turning now to Fig. 1, air enters the valve toward the bottom of the sheet and is turned by the valve proper into flue 13 and passes through checkers (not shown) to the mixing and combustion chambers (not shown). Gas enters through flue 18 and is turned by the valve proper toward the top of the sheet into flue 12 and through checkers (not shown) to the mixing and combustion chambers (not shown). The outgoing products of combustion return to the valves by means of flues 10 and 11 and are turned by the valves into vertical flues 14 and 15, which communicate with outgoing flue 16 leading to the stack. After a predetermined time the valves will be reversed, the lower valve will be turned to the position in which the upper valve is shown in Fig. 1, and the upper valve will be turned to the position in which the lower valve is shown. Everything will now be changed. The incoming air will pass to highly heated checkers (not shown) through flue 11, the incoming gas will pass to highly heated checkers (not shown) through flue 10, and the outgoing products of combustion will come to the valves through flues 12 and 13 and will be turned by the valves into flues 14 and 15 leading to outgoing flue 16 and the stack as before.

The valve proper may be easily removed for repairs or be replaced by removing nipples or nozzles 30 and the upper reservoir and lifting it out of the chamber.

Having thus described my invention I claim:

1. A furnace having a valve chamber whose bottom wall consists of a lower water reservoir and whose top wall consists of an upper water reservoir, a supply pipe leading to the lower reservoir, pipes leading from the lower reservoir through the chamber and discharging into the upper reservoir, and an oscillating valve in the chamber.

2. A furnace having a valve chamber whose bottom wall consists of a lower water reservoir and whose top wall consists of an upper water reservoir, a supply pipe leading to the lower reservoir, pipes leading from the lower reservoir through the chamber and discharging into the upper reservoir, an oscillating valve in said chamber provided with a water reservoir, and water pipes leading to and from the reservoir in the valve.

3. A furnace having a valve chamber whose bottom wall consists of a lower water reservoir and whose top wall consists of an upper water reservoir, a supply pipe leading to the lower reservoir, pipes leading from the lower reservoir through the chamber and discharging into the upper reservoir, a vertically journaled valve in said chamber provided with a water reservoir, a discharge pipe leading from said reservoir through the journal, and a supply pipe leading to said reservoir and lying within the discharge pipe.

4. A furnace having a valve chamber whose bottom wall consists of a lower water reservoir and whose top wall consists of an upper water reservoir, a supply pipe leading to the lower reservoir, pipes leading from the lower reservoir through the chamber and discharging into the upper reservoir, an oscillating valve in said chamber comprising a frame and side plates secured thereto forming a water reservoir, the upper bar of said frame being provided with a hollow journal and supply and discharge pipes passing through said journal.

5. In a furnace, the combination with a valve chamber comprising a lower horizontal closed reservoir, an upper horizontal open reservoir, and four vertical pipes at the corners to conduct water introduced to the lower horizontal closed reservoir to the upper horizontal open reservoir, of a vertical water cooled oscillating vane having a journal through which water is passed and discharges into the upper horizontal open reservoir, said vane seating against the vertical pipes at the corners of the chamber, and means for supplying water under pressure to the lower horizontal closed reservoir.

6. A furnace having a valve chamber whose bottom wall consists of a lower water reservoir and whose top wall consists of an upper water reservoir, a supply pipe leading to the lower reservoir, pipes leading from the lower reservoir through the chamber and discharging into the upper reservoir, an oscillating valve in said chamber provided with a water reservoir and engaging the pipes to form a seal, water pipes leading to and from the reservoir in the valve and stop ribs to limit the oscillation of the valve.

7. In a furnace, a valve chamber having for its bottom wall a water reservoir and for its top wall another water reservoir, pipes leading from the lower reservoir to the upper reservoir and extending partly into the chamber, and an oscillating valve in the chamber adapted to engage the pipes to form a seal.

8. A furnace having a valve chamber whose bottom wall is a lower water reservoir and whose top wall is an upper water reservoir, pipes leading from the lower reservoir to the upper reservoir, a central hub in the upper reservoir, a valve in the chamber having a water reservoir and a journal oscillating in the hub, a collar on said journal, a ball bearing intermediate the collar and the hub and supply and discharge pipes leading through the journal to the reservoir in the valve.

9. A furnace having a valve chamber whose bottom wall is a lower water reservoir and whose top wall is an upper water reservoir, pipes leading from the lower reservoir to the upper reservoir, a central hub in the upper reservoir, a valve in the chamber having a water reservoir and a journal oscillating in the hub, a central lug engaging a step in the wall of the lower reservoir and supply and discharge pipes leading through the journal to the reservoir in the valve.

10. The combination with the brickwork of a furnace having a valve chamber, of a water reservoir forming the bottom wall of said chamber, another water reservoir forming the top wall of said chamber, pipes leading from the lower reservoir and overflowing into the upper reservoir, and an oscillating valve in said chamber consisting of a water reservoir.

11. The combination with the brickwork of a furnace having a valve chamber, of a water reservoir forming the bottom wall of said chamber, another water reservoir forming the top wall of said chamber, pipes leading from the lower reservoir and overflowing into the upper reservoir, an oscillating valve in said chamber consisting of a water reservoir, and means for providing a continuous current of water through said reservoirs.

12. The combination with the brickwork of a furnace having a valve chamber, of a water reservoir forming the bottom wall of said chamber, another water reservoir forming the top wall of said chamber, pipes leading from the lower reservoir and overflowing into the upper reservoir, an oscillating valve in said chamber consisting of a water reservoir, means for providing a continuous current of water through said reservoirs, and means for limiting the movement of the valve in the chamber, said means comprising stop ribs formed on the upper wall of the lower reservoir and the under wall of the upper reservoir.

13. The combination with the brickwork of a furnace having a valve chamber, of a water reservoir forming the bottom wall of said chamber, another water reservoir forming the top wall of said chamber, pipes leading from the lower reservoir and overflowing into the upper reservoir, an oscillating valve in said chamber consisting of a water reservoir, means for supplying water to said reservoirs and means co-acting with the valve to effect a seal against air, gas and the products of combustion.

14. The combination with the brickwork of a furnace having a valve chamber, of a water reservoir forming the bottom wall of said chamber, another water reservoir forming the top wall of said chamber, an oscillating valve in said chamber consisting of a water reservoir, a supply pipe leading to the lower reservoir and pipes leading from the lower reservoir through the chamber and discharging into the upper reservoir, said pipes being engaged by the ends of the valve and forming a seal.

15. The combination with the brickwork of a furnace having a valve chamber, of a water reservoir forming the bottom wall of said chamber, another water reservoir forming the top wall of said chamber, stop ribs on the top and bottom walls of said chamber, water pipes between the reservoirs and extending into the chamber, an oscillating valve in said chamber consisting of a water reservoir and means for supplying the water to said reservoir.

16. The combination with the brickwork of a furnace having a valve chamber whose top and bottom walls are water reservoirs and an oscillating valve in said chamber which is also a water reservoir and is provided with a hollow journal, of a fixed discharge pipe leading from the reservoir in the valve and passing through the journal, and a smaller water supply pipe passing through the discharge pipe and into the reservoir in the valve.

17. A furnace having a valve chamber whose bottom wall consists of a water reservoir having a central hub and whose top wall consists of a water reservoir having a central hub extending from the bottom thereof, of an oscillating valve in said chamber which is also a water reservoir and is provided with a central lug stepped in the hub of the lower reservoir and a hollow journal mounted in the hub of the upper reservoir, a fixed discharge pipe leading from the reservoir in the valve and passing through the journal and a smaller water supply pipe passing through the discharge pipe and into the reservoir in the valve.

In testimony whereof I affix my signature, in presence of two witnesses.

WILLIAM R. PALMER.

Witnesses:
A. M. WOOSTER,
S. W. ATHERTON.